United States Patent [19]

Hansma et al.

[11] Patent Number: 5,581,082
[45] Date of Patent: Dec. 3, 1996

[54] COMBINED SCANNING PROBE AND SCANNING ENERGY MICROSCOPE

[75] Inventors: Paul K. Hansma, Isla Vista; Deron A. Walters, Goleta, both of Calif.; Paul E. Hillner, Berlin, Germany

[73] Assignee: The Regents of the University of California, Oakland, Calif.

[21] Appl. No.: 412,036

[22] Filed: Mar. 28, 1995

[51] Int. Cl.$^6$ .............................. H01J 37/26; G01B 5/28
[52] U.S. Cl. ............................ 250/306; 250/307; 73/105
[58] Field of Search .................................. 250/306, 307; 73/105

[56] References Cited

U.S. PATENT DOCUMENTS

| Re. 34,489 | 12/1993 | Hansma et al. | 250/306 |
|---|---|---|---|
| 4,914,293 | 4/1990 | Hayashi et al. | 250/306 |
| 4,941,753 | 7/1990 | Wickramasinghe | 250/307 |
| 4,947,034 | 8/1990 | Wickramasinghe et al. | 250/216 |
| 5,138,159 | 8/1992 | Takase et al. | 250/306 |

OTHER PUBLICATIONS

Rugar and Hansma, "Atomic Force Microscopy", *Physics Today* 43, 23–30 (Oct. 1990).
Tortonese et al., "Atomic Resolution with an Atomic Force Microscope Using Piezoresistive Detection", *Appl. Phys. Lett.*, 62, (8), 834–836 (Feb. 22, 1993).
Hansma et al., "Tapping Mode Atomic Force Microscopy in Liquids", *Appl. Phys. Lett.* 64, (13), 1738–1740 (Mar. 28, 1994).
Weisenhorn et al. "Imaging and Manipulating Molecules on a Zeolite Surface with an Atomic Force Microscope", *Science*, 247, 1330–1333 (Mar. 1990).
Shotton, "Confocal Scanning Optical Microscopy and Its Application for Biological Specimens", *J. Cell Sci.* 94, 175–206 (1989).
Wilson, "Surface Profile Measurement Using the Confocal Microscope", *J. Appl. Phys.* 53 (7), 5320–5322 (Jul. 1992).
Quate, "Acoustic Microscopy", *Physics Today* 38, 34–40 (1985).
Engel et al., "Scanning Sensor Microscopy of Biological Membranes", *Proceedings of the XIIth International Congress for Electron Microscopy*, San Francisco Press, Inc., 108–109 (1990).
Schabert et al. "Confocal Scanning Laser–Scanning Probe Hybrid Microscope for Biological Applications", *Ultramicroscopy* 53, 147–157 (1994).
Putman et al., "Atomic Force Microscopy Combined with Confocal Laser Scanning Microscopy: A New Look at Cells", *Bioimaging 1, 63–70 (1993).*
Putman et al., "Polymerized LB Films Imaged with a Combined Atomic Force Microscope–Fluorescence Microscope", *Langmuir* 8 (10), 3014–1019 (1992).
Henderson et al. "Imaging F–Actin in Fixed Glial Cells with a Combined Optical Fluorescence/Atomic Force Microscope", *Neuroimage*, 145–150 (1993).
Hansma et al., "A New Optical–Lever Based Atomic Force Microscope", *J. Appl. Phys.* 76, 796–799 (Jul. 15, 1994).

*Primary Examiner*—Jack I. Berman
*Attorney, Agent, or Firm*—Robbins, Berliner & Carson

[57] ABSTRACT

A combined scanning probe and scanning energy microscope, in which the same scanning system is used for both the scanning probe and scanning energy images. A sample is translated substantially along a horizontal plane either between or below the probe of a scanning probe microscope and the objective of a scanning energy microscope. The probe collects topographic or other information. The objective focuses a fixed beam of energy to a small spot on the sample, then collects energy from the same spot and transmits it to a detector. A vertical translator connected to the probe or sample support provides the vertical motion necessary to maintain them in close proximity. The images produced by the two microscopes are in substantial direct registration with each other. The invention is exemplified by a combined atomic force and confocal laser scanning microscope with a translated sample.

98 Claims, 5 Drawing Sheets

COMBINED SCANNING PROBE AND SCANNING ENERGY MICROSCOPE

This invention was made with Government support under Grant Nos. DMR-9123048, DMR-9221637, and DMR-9221781, awarded by the National Science Foundation. The Government has certain rights in this invention.

BACKGROUND OF THE INVENTION

This invention relates to a combined scanning probe microscope (SPM) and scanning energy microscope. In specific embodiments, the combination includes an atomic force microscope used for obtaining a two dimensional image of the topography of the surface of a sample, and a confocal laser scanning microscope used for obtaining a two dimensional image of fluorescence emission light or reflected light from the surface of, or a section through, the sample.

Scanning probe microscopy includes the use of an atomic force microscope (AFM), also called a scanning force microscope (SFM), as well as a scanning tunnelling microscope (STM), the former relying on force, the latter on quantum tunneling effects, to image features ranging in size from atoms (0.1 nanometers) to cells (20 micrometers). Both use a feedback system to monitor and control the probe, a mechanical scanning system, usually piezoelectric, to move the sample with respect to the probe in a raster pattern, and a display system that converts the measured data into an image. In an AFM, the probe is a sharp tip mounted on a soft cantilever spring which is brought into contact or close proximity to the surface of the sample. Means are provided to sense the cantilever's deflection. The voltage that a feedback amplifier applies to the piezo is a measure of the height of features on the sample surface. For a general discussion of AFMs see Rugar and Hansma, "Atomic Force Microscopy", *Physics Today* 43, 23–30 (October, 1990), incorporated herein by reference. Optical detection schemes include beam deflection, for example to a segmented photodiode, and interferometry. Another detection scheme uses a piezoresistive strain sensor embedded in the AFM cantilever. See Tortonese et al., "Atomic Resolution with an Atomic Force Microscope Using Piezoresistive Detection", *Appl. Phys. Lett.* 62, (8), 834–836 (Feb. 22, 1993), incorporated herein by reference.

AFMs can be operated in liquids as well as in air. See Hansma et al. U.S. Pat. No. Re. 34,489: "Atomic Force Microscope With Optional Replaceable Fluid Cell", incorporated herein by reference. Also, instead of contacting the surface with the cantilever tip during the entire scanning cycle, a tapping mode of operation can be used in which the probe-sample separation is modulated as the probe scans over the sample, causing the probe to tap on the surface only at the extreme of each modulation cycle to therefore minimize frictional forces. See Hansma et al., "Tapping Mode Atomic Force Microscopy in Liquids", *Appl. Phys. Lett.* 64, (13), 1738–1740 (Mar. 28, 1994), incorporated herein by reference.

AFMs have been used not only for imaging surfaces, but also for manipulating molecules on a surface. The vertical motion of the cantilever tip is detected by sensing the displacement of a reflective beam with a two-segment photodiode. A feedback loop keeps the vertical deflection of the tip, and therefore the force that the tip applies on the surface, constant by moving the surface up and down with an xyz translator. See Weisenhorn et al., "Imaging and Manipulating Molecules on a Zeolite Surface with an Atomic Force Microscope", *Science*, 247, 1330–1333 (March 1990).

Scanning energy microscopy broadly encompasses any means of scanning with focused energy including confocal scanning optical microscopy (CSOM), such as confocal laser scanning microscopy (CLSM), as well as other focused energy methods such as acoustic microscopes. In CLSM, the specimen is scanned by a diffraction-limited spot of laser light, and light transmitted or reflected by the in-focus illuminated volume element (voxel) of the specimen, or the fluorescence emission excited within it by the incident light, is focused onto a photodetector. An aperture, usually slightly smaller in diameter than the Airy disc image, is positioned in the image plane in front of the detector, at a position confocal with the in-focus voxel of the specimen, which can also be referred to as a focal spot, or specific to a confocal microscope, a confocal spot. Light from the focal spot passes through the aperture of the detector, while light from any region above or below the focal plane is defocused at the aperture plane so that it is largely prevented from reaching the detector, thus contributing essentially nothing to the confocal image. The optical sectioning obtained by reducing out-of-focus blur enables three-dimensional tomography. See Shotton, "Confocal Scanning Optical Microscopy and its Application for Biological Specimens", *J. Cell Sci.* 94, 175–206 (1989), incorporated herein by reference. Confocal microscopy has been used to measure the profile of a surface. See Hamilton and Wilson, "Surface Profile Measurement Using the Confocal Microscope", *J. Appl. Phys.* 53 (7), 5320–5322 (July 1982), incorporated herein by reference. For a description of acoustical microscopy, see Quate, "Acoustic Microscopy", *Physics Today* 38, 34–40 (1985), incorporated herein by reference.

Both scanning probe microscopy and scanning energy microscopy have been successful at imaging biological samples. Since they typically collect different information about the sample, confocal and scanning probe microscopes have been productively combined. An early reference, Engel et al., "Scanning Sensor Microscopy of Biological Membranes", *Proceedings of the XIIth International Congress for Electron Microscopy*, San Francisco Press, Inc., 108–109 (1990), incorporated herein by reference, describes a scanning sensor microscope combined with a high resolution light microscope equipped for fluorescence and scanning confocal microscopy. Silicon nitride AFM cantilevers were used as well as insulated STM tips and pipettes for ion pickup, each with stationary samples. The combination of a SFM or a STM with a confocal microscope is described in Schabert et al., "Confocal Scanning Laser—Scanning Probe Hybrid Microscope for Biological Applications", *Ultramicroscopy* 53, 147–157 (1994), incorporated herein by reference. The sample is stationary. The confocal microscope is independent of the SFM or STM and uses galvanometric mirrors to get confocal images using reflection and fluorescence data. A stand-alone AFM combined with a CLSM and used both with the sample in air and under water for simultaneously obtaining AFM and CLSM images is described by Putman et al., "Atomic Force Microscopy Combined with Confocal Laser Scanning Microscopy: a new look at cells", *Bioimaging* 1, 63–70 (1993), incorporated herein by reference. Here, too, the sample remains stationary and the probes are moved. The combination of an AFM and a simple fluorescent microscope, operated either in air or under liquid, is described by Putman et al., "Polymerized LB Films Imaged with a Combined Atomic Force Microscope-Fluorescence Microscope", *Langmuir* 8

(10), 3014–3019 (1992), incorporated herein by reference. In *Putman* (1992), an object can be selected and moved with a translation stage to the AFM tip to be imaged. The sample is stationary during scanning operations. A similar device is described by Henderson et al., "Imaging F-Actin in Fixed Glial Cells with a Combined Optical Fluorescence/Atomic Force Microscope, *Neuroimage,* 1145–1501 (1993), incorporated herein by reference.

In prior combined AFM-CLSM devices, the AFM is usually a "stand-alone" design in which the confocal (illuminated and detected) spot sweeps through the sample; the sample is not scanned. One drawback to this approach is that the means for scanning the in-focus voxel is independent from the means for scanning the AFM probe. The means for scanning the in-focus voxel, in general, has a different scan range and different nonlinearities from the means for scanning the AFM probe. See, e.g. FIG. 6 in Schabert et al., supra. Thus, it is often difficult to obtain registration and compare features between separate images. A further drawback to this approach is the limited scan sizes of both the AFM and confocal images. Standalone AFMs with optical lever detection, for example, have a very limited scan range without a method for optically tracking the cantilever, on the order of tens of microns. Designs with optical tracking have been introduced to circumvent this problem. However, the scan range of the independently scanned in-focus voxel is stringently limited to the field of view of the microscope objective, which is a 200 µm diameter region for a 100× objective. Off-axis optical aberrations may even preclude the use of the entire field of view of the objective.

SUMMARY OF THE INVENTION

The combined scanning probe and scanning energy microscope of the present invention alleviates the foregoing difficulties by using a scanned-sample approach wherein the sample is moved in scanning fashion while the probe and in-focus voxel can remain fixed. Optical cantilever tracking is not required and the in-focus voxel can be centered in the microscope objective. The scan range can be as large as the scanning hardware permits; for example, a piezo translator can scan the sample in a square up to 300 µm on a side. When the probe is positioned at the in-focus voxel, the scanning probe and confocal images are acquired in direct registration, allowing the image features to be easily correlated. When the probe is positioned at a small lateral distance from the in-focus voxel, the images are still in substantial registration so that only simple adjustment need be made. The scanning probe and confocal images can be acquired simultaneously or sequentially.

The combined scanning probe and scanning energy microscope of the present invention provides a major opportunity not otherwise available since it provides two main modes of operation: planar imaging and surface tracking. For planar imaging, the sample will move in the x-y plane only for each image. Thus, the confocal microscope will, as is conventional, image a slice of the sample at the particular z value at which it is focused. For this mode, the scanning probe microscope tip will move vertically along the z axis as the sample moves under the probe. The scanning probe microscope will record the height, z, of the sample at each point in the image. The sample can be reimaged with the confocal microscope focused at different z values and a three dimensional image built up, again conventionally, by tomographic computer reconstruction. This will, among other effects, give an optical resolution image of the surface in registry with the high resolution image from the scanning probe microscope. The optical image can show, with fluorescent labeling, the location, for example, of protein assemblies for high resolution imaging with the scanning probe microscope. This helps to cure the usual difficulty, with scanning probe microscope images of complex surfaces, of identifying unambiguously what is being imaged where.

Surface tracking can be accomplished by holding the tip of the scanning probe microscope at constant height in contact with the surface. Since the scanning probe microscope is capable of determining the topography of the sample, it is possible to move the sample so that both the probe and the in-focus voxel follow the surface of the sample. This can be accomplished by employing an AFM as the scanning probe microscope, supporting the sample on a vertical translator, and applying a feedback voltage to the scanner that moves the sample vertically in z as it moves it horizontally in the x-y plane during imaging so as to maintain a constant deflection of the AFM cantilever. The confocal microscope is focused just below the apex of the tip. Since the tip stays stationary while the surface is scanned beneath it by movement of the sample, the confocal microscope will always be focused at the surface. Thus, it will give an image of what is on the surface in one pass, without the need to reconstruct the image from multiple slices. The topographical information will be lost from the confocal image, but will be available, at higher resolution, from the scanning probe image. The same computer that records all the information can display a combined image with the confocal information about what is on the surface provided, in registry, onto the topographic image from the scanning probe microscope.

Similarly, additional tracking images can be obtained with the in-focus voxel at various distances, αz, below the tip of the scanning probe microscope. Each of these images will reveal what is αz below the surface. A family of images will give information about what is below the surface of a complex material, for example a biomaterial, as a function of distance αz. This information will be obtained in a more direct fashion than from a complex three-dimensional reconstruction since each image will come out in real time, allowing the researcher to find directly, for example, how far a particular layer lies below a surface.

Other schemes have been proposed for tracking the surface of a sample using a confocal microscope alone (see Hamilton and Wilson, supra). However, the method of the present invention is superior since (a) the scanning motion can follow the surface directly, without moving through a cycle of vertical motion at each point on the image, and (b) the method can be used to probe fluorescent samples, not solely reflective samples. For example, this method of imaging should be of great value to biologists studying proteins on the surfaces of cells using fluorescent immunolabeling.

A combined scanning probe and scanning energy microscope of the present invention comprises a support for a sample having a surface to be scanned, a probe arranged so as to be in contact with, or closely proximate to, the sample surface; means, e.g., an objective, for focusing energy to a focal spot less than 10 µm in spatial dimension on or below the surface of the sample; and means for detecting energy reflected, transmitted or fluorescently emitted from the focal spot. The probe and the focal spot are aligned and the sample is translated substantially along a horizontal plane with respect to the probe and the objective so as to produce scanning probe and scanning energy microscope images in substantial registration. In preferred embodiments, the scanning probe microscope is an AFM and the scanning energy microscope is a CLSM.

In particular embodiments, the sample is translated between the probe and objective lens. In others, for example where the sample is opaque to the focused energy, the sample is translated below both the probe and objective. The probe and focal spot can be aligned on-axis or laterally separated by a small offset. To enable the focal spot to follow the surface of the sample, the sample support is moved vertically by a z translating piezoelectric member controlled by feedback from the probe that indicates the sample surface height to maintain the probe and focal spot on, or in close proximity to, the sample surface. For planar imaging with the focal spot, the probe is moved vertically by a z translating piezoelectric member controlled by feedback from the probe that indicates the sample surface height. Optionally, the focal spot can be translated vertically independently from the probe and sample, to adjust the vertical distance between the probe and the focal spot. Also optionally, the probe and the focal spot can be vertically translated simultaneously or in tandem. Also optionally, the focal spot and the probe can independently be translated along the plane of the sample.

In other particular embodiments, the probe generates triboluminescent energy resulting from interaction of the probe with the sample, which is detected by the confocal scanning energy microscope. In still other embodiments, the energy generated by the scanning energy microscope is an acoustic signal detected by the cantilever of the AFM. Alternatively, the scanning probe microscope is a scanning tunneling microscope and the energy it detects is a photocurrent resulting from the focal spot of the scanning energy microscope.

DESCRIPTION OF THE DRAWINGS

The following briefly describes each of the drawings, in which some components, particularly the scanning probe tip, is greatly exaggerated for clarity of illustration.

DETAILED DESCRIPTION

Figure 1:
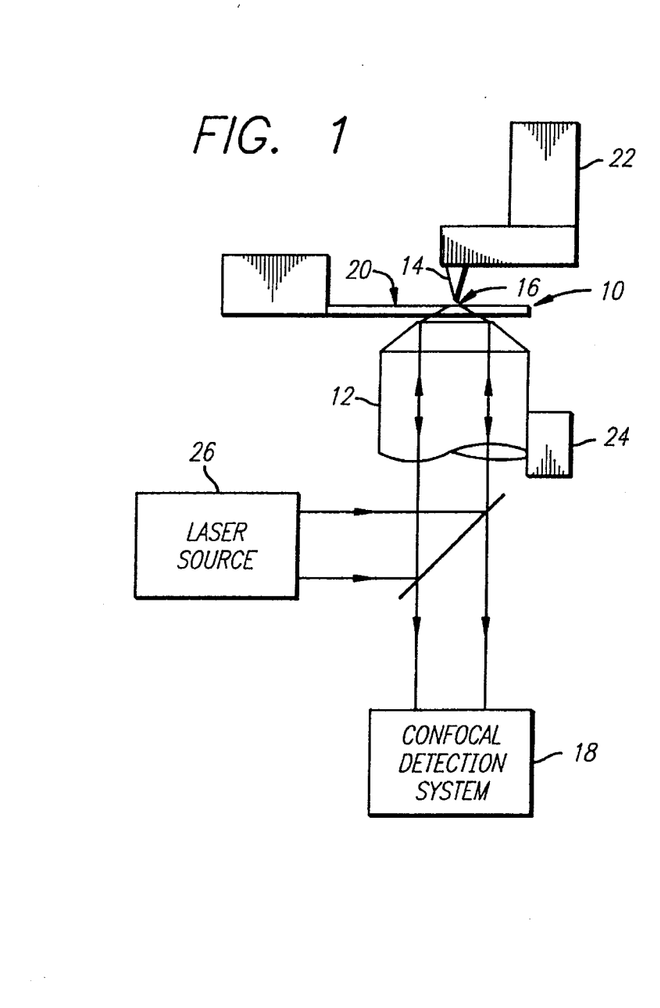
FIG. 1 is a simplified schematic drawing of a combined scanning probe and scanning energy microscope of the invention in general form, in which the sample is scanned along a plane between the scanning probe and objective.

Basic elements of a combined scanning probe and scanning energy microscope according the present invention are depicted in the simplified schematic drawing of FIG. 1. In this embodiment, a transparent sample support 10 bearing a sample, is located between the objective lens 12 of a scanning energy microscope and the probe 14 of a scanning probe microscope. A scanner, such as a piezoelectric translator, scans the sample horizontally along the x-y plane while the objective lens 12 focuses light (or other energy) into a spot 16 on the sample causing the emission of light or energy from this focal spot 16, whether by emission, reflection or by fluorescence. This emitted light or energy is collected by the same objective lens 12 and transmitted to a detector 18.

To maintain proximity between the probe 14 of the scanning probe microscope and the surface 20 of the sample, a vertical translator which can control this proximity is attached to the probe, at 22, or to the sample support 10, or to both. It is not essential to have a means of translating the focal spot 16 vertically, but such a means, at 24, can be valuable in certain applications of the instrument. The energy that is focused by the objective lens can be light from a laser source 26 as illustrated, or it can be from some other energy source. For example it can be an acoustic signal which could be detected by an acoustic wave detector. The energy microscope also could be used to detect an energy signal which the probe generates, e.g. through a triboluminescent interaction with the sample. Also, the probe could be used to detect a signal which the energy microscope generates, e.g., an STM could detect a photocurrent due to light from the focal spot of a CLSM.

The sample can be translated both vertically along the z axis as well as horizontally along the x-y plane, by use, e.g., of piezo tubes, piezo stacks, or electrostrictive elements. Mechanical positioners, not shown allow coarse alignment. Optionally, the scanning energy microscope can include means for scanning the probe and the focal spot horizontally along the x-y plane. When necessary, this would allow the scanning probe and scanning energy microscope components to acquire images without moving the sample, avoiding possible limitations, e.g. scan speed, of the sample translation means used during the combined operation.

Figure 2:
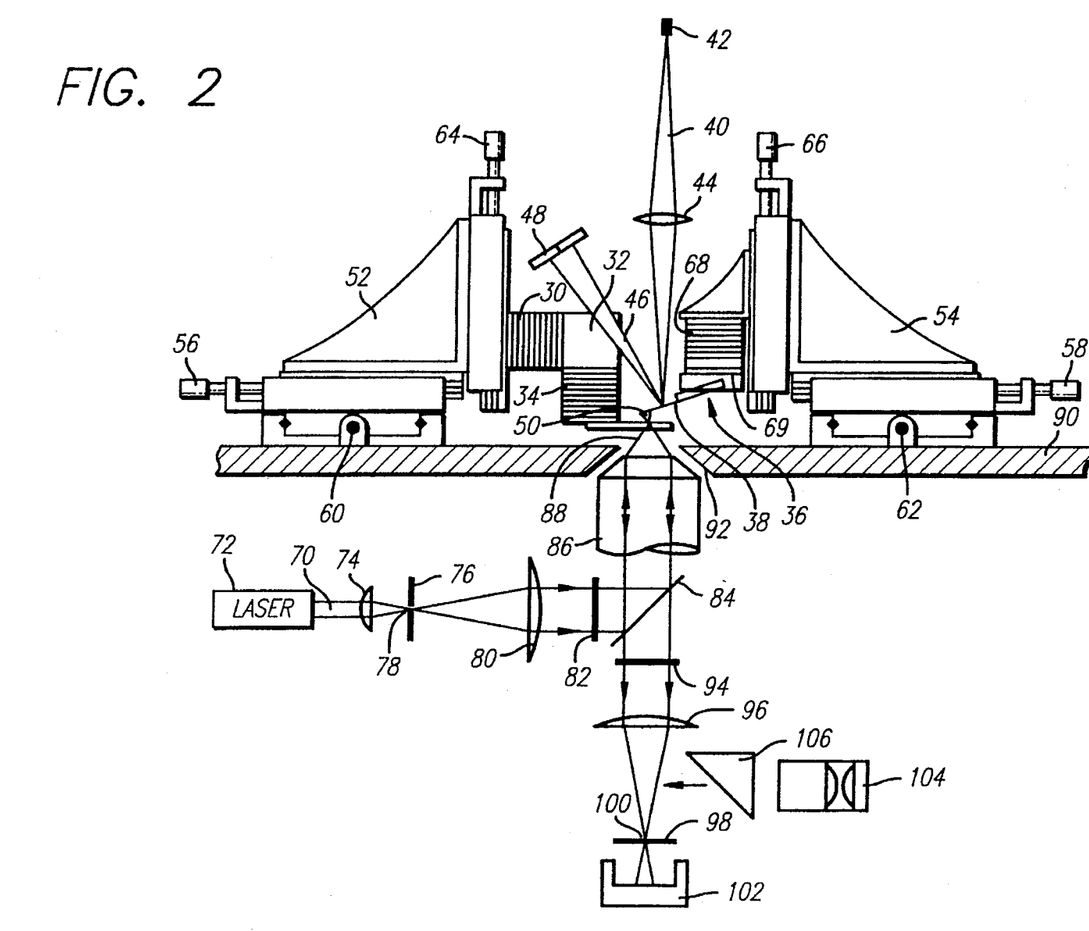
FIG. 2 is a schematic drawing of a combined atomic force and confocal laser scanning microscope in a preferred embodiment of the invention.

FIG. 2 illustrates a combined atomic force and confocal laser scanning microscope in a preferred embodiment of the invention. The sample, contained on a transparent support 10, is scanned by a three-axis translator 28 consisting of three piezo stacks 30, 32 and 34 secured to each other, e.g. by adhesive, at right angles to each other and respectively providing x, y and z translations. In place of piezo stacks, one can use piezo tubes, or electrostrictive elements, all of which are well known in the art. The piezo stacks 30, 32 and 34 are of conventional design and are connected to wires to a source of DC voltage, in the range of 100 volts and via electrodes to the piezo stack. The construction of the piezo stacks 30, 32 and 34, their wiring and connection to a voltage source, are well known in the art, are not per se part of the invention and, therefore, are not shown.

The scanning probe microscope is an AFM containing a cantilever 38 held in a module 36 as an optical lever. The deflection of the cantilever 38 is measured by illuminating it with laser light 40 from a laser diode 42 through a focusing lens 44 and collecting the reflected light 46 on a segmented photodiode detector 48. The cantilever 38 is a soft spring, formed, e.g. of silicon nitride and carries a hard, sharp tip 50, e.g. of diamond, silicon or silicon nitride to contact the surface of the sample. The details of the AFM including the construction and operation of the cantilever module, the scanning tip and optical lever, are well known in the art, and are not per se part of the invention.

Both the sample and the atomic force microscope are mounted on three-axis mechanical translators, respectively 52 and 54, in which x axis screw adjusters 56, 58, y axis screw adjusters 60, 62, and z axis screw adjusters 64, 66 respectively, provide positioning. The cantilever module 36 is translated vertically along the z axis by a piezo stack 68 which can be constructed and wired in the same manner as the z axis piezo sample scanner 34. An additional piezo element 69, such as a stack or bimorph, introduces a modulation in the probe-sample separation, such that the probe is only in contact with the sample at the extreme of each modulation cycle. The operation of a scanning probe microscope with such a modulation is well known in the art and is not per se part of the invention.

The scanning energy microscope is a CLSM using a light beam 70 from a laser source 72 which is focused by a lens 74 to pass through a light barrier 76 formed with a pinhole 78, to a recollimating lens 80. From there the light beam passes through an optical filter 82 to a beam splitter 84, then through an objective lens 86 to form a focal spot 88 which is the focal spot of the instrument. A housing for the combined microscope assembly has a support plate 90 that carries the sample mechanical translator 52 and the AFM mechanical translator 54, and is formed with an opening 92 to accommodate the objective lens 86 so that the focal spot 88 can be located to impinge at a desired location on or in the sample. The light beam 70 transmitted or reflected by the in-focus illuminated voxel of the specimen (or fluorescence emission excited within the voxel by the incident light beam) is transmitted back through the objective lens 86 and beam splitter 84. It then passes through a filter 94 and lens 96 to pass through a light barrier 98 formed with a pinhole 100, to a detector 102.

The pinholes 78 and 100 are conjugate to the focal spot 88 of the objective lens. The barrier 76 and pinhole 78 associated with the laser source 72 serves to improve the spatial intensity profile of the light beam. The pinhole 100 of the barrier 98, associated with the detector 102 is slightly smaller in diameter than the Airy disc image. It is positioned in the image plane in front of the detector 102 at an adjustable position confocal with the in-focus voxel. Light from the focal spot passes through the pinhole 78 while light from any region above or below the focal plane is defocused at the barrier 98 so that it is largely prevented from reaching the detector 102, thus contributing essentially nothing to the confocal image. It is the optical sectioning obtained by reducing out-of-focus blur that enables three-dimensional tomography.

The filter 82 associated with the laser 72 is a bandpass filter selected to pass only the incident laser light 70. The filter 94 associated with the detector 102 is optional and is also a bandpass filter selected to pass only fluorescent light from the sample as appropriate. The beam splitter 84 can be a dichroic beam splitter which reflects the short wavelengths of the laser light beam 70 but transmits only longer wavelengths emitted from the sample, e.g. fluorescent light. Alternatively, the beam splitter 84 can be a partially silvered mirror. While the confocal microscope is on, the mechanical translators 52 and 54 are used to position the cantilever tip 50 in alignment with the focal spot 88 so that the AFM and CLSM images are acquired in direct registration. To aid in aligning the cantilever tip 50 and the focal spot 88, an optional eyepiece 104 and prism 106 assembly is provided which can be slid into and out of the path of the reflected or emitted light beam at a point just before the pinhole 100 associated with the detector 102.

Although not illustrated, the AFM can be equipped with a fluid cell, which holds fluid that surrounds the cantilever 38 and covers the top surface of the sample that is probed by the cantilever tip 50. The use of a liquid between the tip 50 and sample reduces forces applied to the sample by the cantilever. Different liquids can alter the characteristics of the scanning probe.

Figure 3:
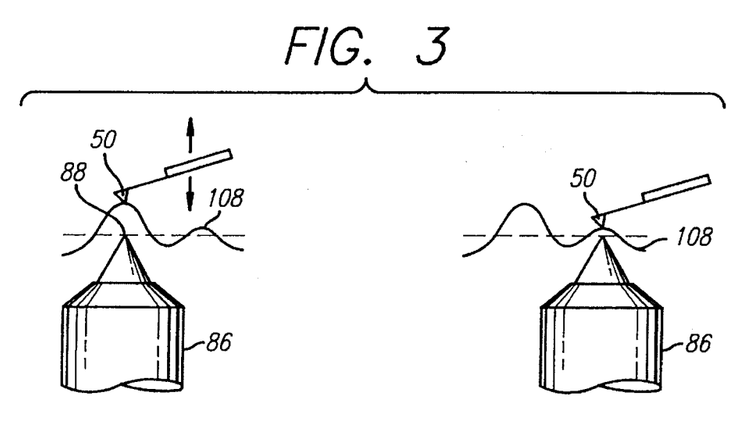
FIG. 3 is an enlarged schematic drawing of the cantilever tip and focusing end of the objective of the microscope of FIG. 2 illustrating the planar imaging mode.

FIG. 3 illustrates a planar imaging mode of operation of the combined AFM and CLSM microscope in which the sample 108 will only move in the x-y plane for each image so that the confocal microscope will image a slice of the sample 108 at the particular z value at which it is focused. For this mode, the cantilever tip 50 will move vertically along the z axis as the sample 108 moves under the tip 50 along the x-y plane. The AFM will record the height of the sample at each point in the image. The sample can be imaged at the same time or reimaged with the CLSM focused at different z values to build a three dimensional image by tomographic computer reconstruction. The result is an optical resolution image of the surface in registry with the high resolution image from the AFM.

Figure 4:
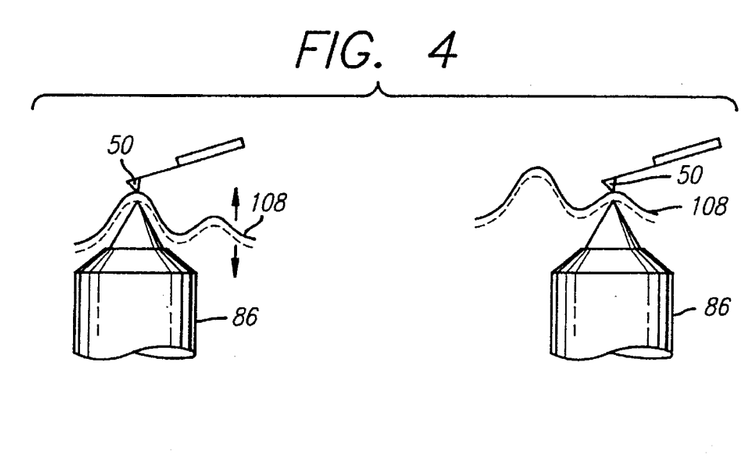
FIG. 4 is an enlarged schematic drawing of the cantilever tip and focusing end of the objective of the microscope of FIG. 2 illustrating the surface tracking mode.

FIG. 4 illustrates a surface tracking mode of operation of the combined AFM and CLSM microscope in which the cantilever tip 50 is held at constant height in contact with the surface while the sample is moved vertically along the z axis, in addition to moving in the x-y plane for each image, so that both the probe and the focal spot follow the surface of the sample. The CLSM is focused just below the apex of the tip. The CLSM will always be focused at the same $\alpha z$ since the tip stays stationary while the surface is scanned beneath it by movement of the sample.

Figure 5:
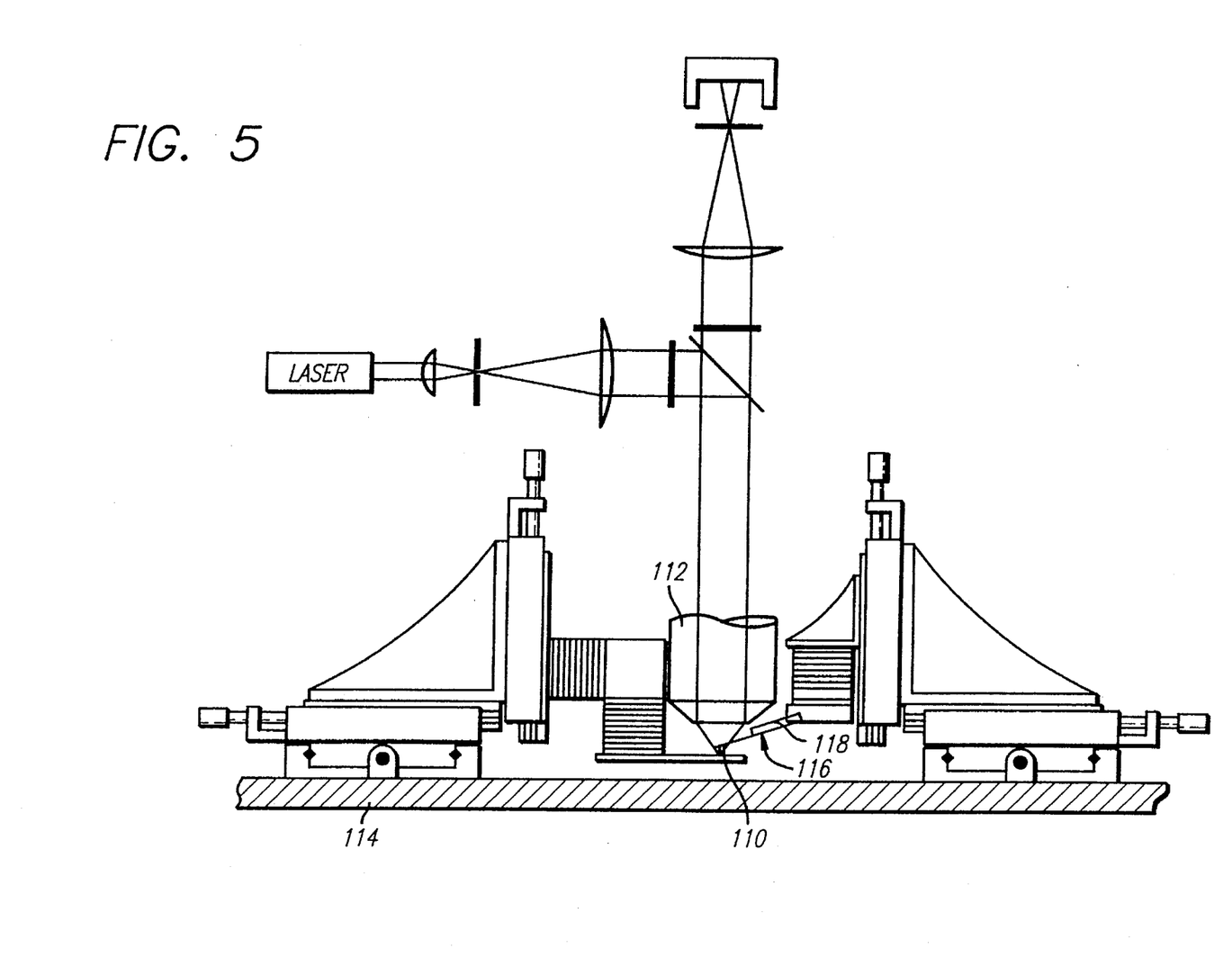
FIG. 5 is a schematic drawing of a combined atomic force and confocal laser scanning microscope in another embodiment of the invention, in which the sample is scanned along a plane below both the scanning probe and objective.

Additional tracking images can be obtained with the laser focused at various distances below the tip 50. A family of images obtained in real time will give information about what is below the surface of a complex material as a function of $\Delta z$. In addition the AFM can be operated in a tapping mode by applying a dithering ac voltage to the vertical piezo translator 68 (FIG. 2) or by applying a modulation voltage to piezo element 69 (FIG. 2). The tip-sample separation is modulated as the tip scans over the sample, causing the tip to tap on the surface only at the extreme of each modulation cycle to therefore minimize frictional forces. The voltage that a feedback amplifier applies to the piezo is a measure of the height of features on the sample surface. Such a procedure is described by Hansma et al. supra FIG. 5 illustrates another embodiment of the invention that is similar to FIG. 2 but in which the CLSM is placed on the same side as the AFM so that the sample is scanned along a plane below both the cantilever tip 110 and the objective 112. Such a same-side instrument is useful for opaque samples. The components are the same as in FIG. 2 except as necessary to accommodate disposition of the CLSM above the sample. A long-working-distance objective is used and there is no optical lever, nor is there any need for an aperture in the housing support plate 114. Rather the AFM cantilever 116 is a piezoresistive cantilever, for example as described by Tortonese et al, supra. Feedback from the piezoresitive element 118 provides the same z axis information about the cantilever tip 110 as obtained from the optical lever of FIG. 2.

Figures 6, 7A, 7B, 8:
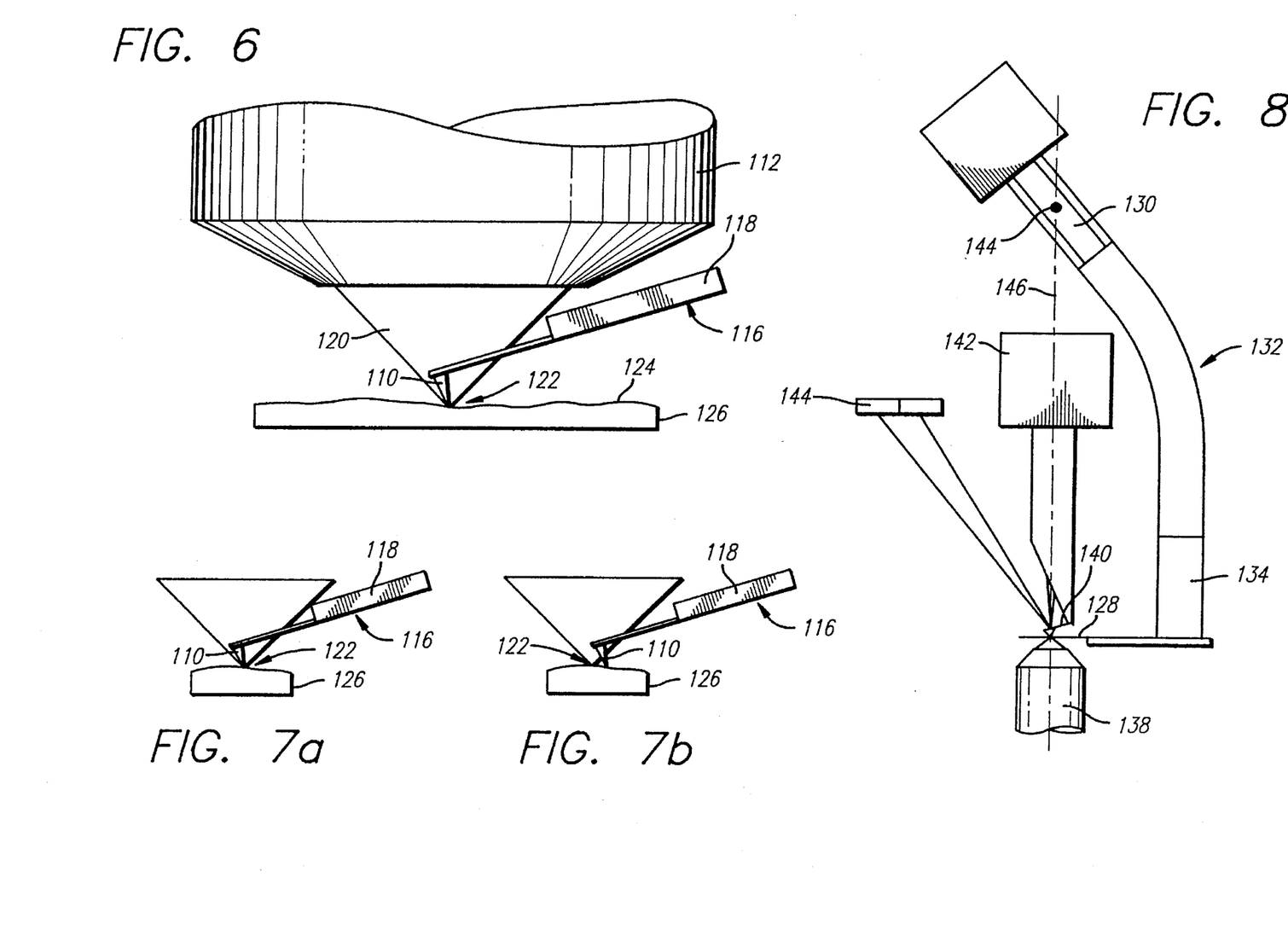
FIG. 6 is an enlarged drawing of the tip and objective of the combined microscope of FIG. 5.
FIGS. 7a and 7b show alternative horizontal positions for the tip of the combined microscope of FIG. 5, respectively on-axis and off-axis.
FIG. 8 is a schematic drawing of a combined atomic force and confocal laser scanning microscope in still another embodiment of the invention.

FIGS. 6, 7a and 7b show enlargements of the objective-cantilever-sample region of the same-side AFM-CLSM instrument of FIG. 5. In FIG. 6, The objective 112 focuses the laser light beam 120 to a focal spot 122 on the surface 124 of the sample 126 and the cantilever tip 110 is positioned to be exactly on the axis of the focal spot 122, as also shown in FIG. 7a. In FIG. 7b, the cantilever tip 110 is slightly off axis, i.e., offset from the axis of the focal spot 122. This offset will completely eliminate interference by the cantilever tip 110 with the CLSM but will result in offsets between the AFM images and the CLSM images. However, since the offsets are small and known, they can be compensated for. For this instrument it would be useful to use a reflective objective for its long working distance. The usual disadvantage of a secondary mirror that blocks optical access along the optical axis, is not a problem since the cantilever blocks that access anyway.

Referring to FIG. 8, still another alternative embodiment is illustrated. The sample 128 is attached to an xy-piezo tube 32 scanner (J-scanner, Digital Instruments, Santa Barbara, Calif.) by a boom 32 of 17.5 cm total length. The boom is formed from thin-walled stainless steel tubing, and incorporates a second, z-piezo tube 134 (from a J-scanner) to provide vertical motion to the sample. The z scanner is supported by a sliding plate (not shown) above the rest of the objective of a CLSM, allowing for a centering adjustment.

Scanning voltages are provided by a scanning probe microscope controller (Nanoscope III, Digital Instruments). While regions up to 300 are accessible, a scan size of 100 μm is most useful. This requires less effort for the centering adjustment, and gives a pixel size comparable to the confocal resolution. Scan rates are usually 1 s per line (trace and retrace together, giving an image in 256 s or 5 12 s. Faster scans tend to excite the lowest oscillation mode of the boom 132 distorting the image periodically.

A standard silicon nitride AFM cantilever 140 is mounted above the sample. Deflections of this cantilever 140 are measured by an optical lever system, 142 consisting of a prior art scanned stylus AFM. See Hansma et al., "A New Optical-Lever Based Atomic Force Microscope," *J. Appl. Phys.* 76, 796–799 (Jul. 15, 1994), incorporated herein by reference. This AFM includes a red diode laser, an x, y, z, piezo and a lens system to keep a focused spot of light on the cantilever 140 even when the cantilever is moved by the x, y, z piezo. Here, the z part of the x, y, z, piezo can be used as described for the vertical piezo translator 68 of FIG. 2. The x, y, z, parts of said x, y, z, piezo can be used to position precisely the tip of the cantilever over the focal spot by applying dc voltages in the range of −220 to +220 v. Light is focused on the back of the cantilever 140 and reflected onto a two-segment photodiode 144. Red polycarbonate filters at the diode laser and at the photodiode reduce artifacts in the AFM images caused by scattered light.

The height of the sample 128 is adjusted with the z-piezo to track the sample topography. In the case of flat samples, the effect is similar to a "planefit", removing residual sample tilt from the AFM image and keeping the deflection of the cantilever 140 within the measurable range. Tracking of the sample surface also keeps the confocal optics in sharpest focus across the whole field of view.

The AFM cantilever is aligned in the focal spot of a CLSM system. Its optical train is as follows: polarized 15 mW argon-ion laser (Omnichrome, Chino, Calif.); spatial filter with pinhole diameter 25 μm; recollimating lens with N.A. 0.09; variable attenuator; 512/10 nm bandpass filter (Chroma, Brattleboro, Vt.); 525 nm cut-off dichroic mirror (Chroma); 100×/N.A. 1.30 oil-immersion objective (Zeiss, Wetzlar, Germany). Fluorescent emission from the sample is collected by the same objective and passes through the dichroic mirror. It then is cleaned by a 560/60 nm bandpass filter (Chroma), which rejects both excitation laser and AFM laser light. The fluorescent emission is then imaged by the standard 10× eyepieces (Zeiss) for initial alignment or routed to a spatial filter and PMT (Hamamatsu, Tokooka Vill., Japan) for CLSM imaging. The spatial filter incorporates a lens with N.A. 0.016, and a 50 μm pinhole. The signal from the PMT is amplified by a differential amplifier (PAR, Princeton, N.J.) and recorded by the scanning probe microscope controller in conjunction with the AFM image.

A simple piezo tube scanner does not maintain its ends parallel which results in spherical curvature of the scanned field. The sphere is approximately centered on the piezo tube 130, regardless of the length or shape of the boom 132 between the sample 128 and the piezo tube 130. If the sample is offset from the center 144 of scan curvature, then it will suffer substantial vertical motion during the scan. Where $\phi$ is the angle scanned, z ($\phi$) is the distance moved vertically, x ($\phi$) is the distance scanned horizontally, r is the radius of scan curvature, and d is the offset between the center of scan curvature and the imaging axis, we find that $$x(\phi) = r \tan \phi - d(\sec \phi - 1), \text{ and} \tag{1}$$

$$z(\phi) = r(1 - \cos \phi - \sin \phi \tan \phi)^\circ d \tan \phi. \tag{2}$$

Expanding these to quadratic order in $\phi$ yields $$x(\phi) = r\phi - \frac{d}{2} \phi^2; \tag{3}$$

$$z(\phi) = d\phi - \frac{r}{2} \phi^2. \tag{4}$$

Assuming that the scanning probe microscope controller has been calibrated in terms of $x(\phi)$, we eliminate $\phi$ and obtain $$z(x) = \frac{d}{r} x - \frac{1}{2r} x^2 \tag{5}$$

as the vertical sample motion. This will also be the "sample profile" seen by the AFM on a perfectly flat sample.

The imaging techniques considered in this embodiment are intolerant of large vertical motions. The maximum measurable deflection of the AFM cantilever 136 is a few hundred nanometers, and the depth of the focal spot is comparable. By moving the sample vertically to track its topography, μm. If a scan size of 100 μm is required for practical use, then d/r must be <0.04. In order to achieve this without an unduly long boom 132 (and unduly low resonant frequency thereof), the piezo xy tube 130 must be centered within 9 mm of the imaging axis for a 100 μm scan as shown by the dashed line 146 in FIG. 8. Larger scan sizes require proportionately finer centration.

Results using this invention are superior to other methods. To illustrate this, Langmuir-Blodgett films of 10, 12-pentacosadiynoic acid (PCA), a solution of PCA, 1 mg/ml in chloroform, was spread at the air-water interface of a Langmuir trough (Munich Trough, Munich, Germany), which had several cover slips and microscope slides lying on the bottom under the water (MilliQ purified, Millipore, Bedford, Mass. ). The PCA layer was compressed to a pressure of ca. 25 mN/m and irradiated with 4.5 mW/cm² shortwave ultraviolet for ca. 30 s, or until the PCA film had turned pink, showing that it had polymerized. Cover slips and microscope slides were lifted horizontally through the PCA film with tweezers and allowed to air-dry. They were attached to the boom 130 with Super Glue Gel (Devcon, Wood Dale, Ill.) for imaging. The images can be collected simultaneously, or successively.

Figure 9:
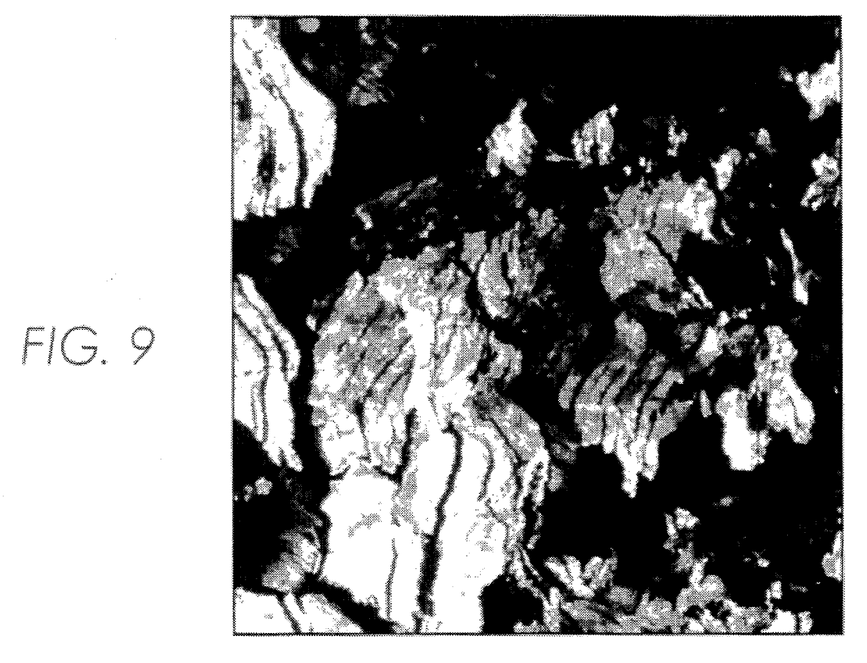
FIG. 9 shows the surface of a polymerized PCA film imaged with the CLSM component of the combined microscope of FIG. 8.
Figure 10:
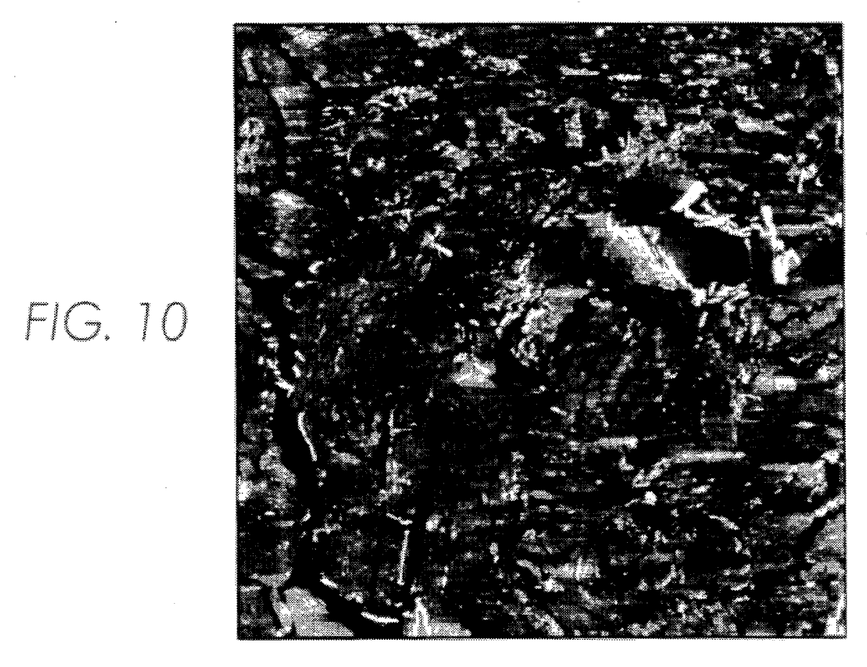
FIG. 10 shows the surface of a polymerized PCA film imaged with the AFM component of the combined microscope of FIG. 8.

FIGS. 9 and 10 show a polymerized PCA film as imaged with both CLSM and AFM, respectively. The film is polycrystalline, with each domain displaying a family of parallel cracks in a different direction. The AFM resolves these cracks quite well; in fact, its resolution is better than the pixel size of 195 nm. A smaller scan size could take advantage of this higher resolution. The AFM also responds to the approx. 1 μm diameter bumps on the surface of the film. While the CLSM has lower resolution, circa 300 nm, its probes the optical properties of the film. The yield of fluorescent emission from polymerized PCA depends on the angle between the polarization of the incident light and the crystalline axes of the film. See Goettgens et al., "Molecular Order in Polymerizable Langmuir-Blodgett films Probed by Microfluorescence and Scanning Force Microscopy." *Langmuir* 8, 1768–1774 (1992). This is visible in the varying brightness of different domains in FIG. 9. The brightest domains have cracks aligned parallel to the polarization direction, as in previous results (Putman et al., 1992), supra.

The registration of the images surpasses previous results. Compare the hole in the film at upper left (dark in both images). The offset, circa 4.5 μm, is due to a slight misalignment between the AFM cantilever tip and the focal spot. Such a slight offset could actually be beneficial if the immediate proximity of the tip were expected to alter the fluorescent behavior of the sample.

We claim:

1. A combined scanning probe and scanning energy microscope, comprising:
   a support for a sample having a surface to be scanned;
   a probe arranged so as to be in contact with, or closely proximate to, said sample surface;
   means for focusing energy to a focal spot at said sample and for detecting energy reflected or transmitted from said focal spot;
   means for aligning said probe and said focal spot; and
   means for translating said sample substantially along a horizontal plane with respect to said probe and said focusing means whereby to produce scanning probe and scanning energy microscope images in substantial registration.

2. The combined microscope of claim 1 in which said plane is between said probe and said focusing means.

3. The combined microscope of claim 1 in which said plane is below said probe and said focusing means.

4. The combined microscope of claim 1 in which said probe and focal spot are aligned relatively on-axis.

5. The combined microscope of claim 1 in which said probe and focal spot are laterally separated by a small offset.

6. The combined microscope of claim 1 in which said focal spot is less than 10 micrometers in spatial dimension at said sample.

7. The combined microscope of claim 1 in which said focal spot is below the surface of said sample.

8. The combined microscope of claim 1 in which said focal spot is on the surface of said sample.

9. The combined microscope of claim 1 including means for translating said probe normal to said plane.

10. The combined microscope of claim 1 including means for translating said focal spot normal to said plane.

11. The combined microscope of claim 10 including means for translating said probe normal to said plane.

12. The combined microscope of claim 11 in which said probe generates a signal indicative of sample surface height, and including feedback means responsive to said sample surface height signal to maintain said probe and focal spot on, or in close proximity to, said sample surface during said scanning operations.

13. The combined microscope of claim 12 in which said signal responsive means includes means for translating said sample normal to said plane.

14. The combined microscope of claim 12 in which said signal responsive means includes means for translating said probe and focal spot in tandem.

15. The combined microscope of claim 1 including means for translating said focal spot along said plane.

16. The combined microscope of claim 1 including means for translating said probe along said plane.

17. The combined microscope of claim 1 in which said means for focusing and detecting energy is capable of detecting energy generated by said probe.

18. The combined microscope of claim 17 in which said probe-generated energy comprises triboluminescent energy resulting from interaction of said probe with said sample.

19. The combined microscope of claim 1 in which said probe is capable of detecting energy generated by said energy focusing means.

20. The combined microscope of claim 19 in which said scanning probe microscope is an atomic force microscope and said energy is an acoustic signal.

21. The combined microscope of claim 19 in which said scanning probe microscope is a scanning tunneling microscope and said generated energy is a photocurrent.

22. The combined microscope of claim 1 including means for mechanically moving said probe and said focusing means both along said plane and normal to said plane whereby to effect at least approximate alignment of said probe and focusing means.

23. The combined microscope of claim 1 in which said translating means comprises X and Y translating piezoelectric members.

24. The combined microscope of claim 9 in which said means for translating said probe normal to said plane comprises a piezoelectric member.

25. The combined microscope of claim 10 in which said means for translating said focal spot normal to said plane comprises a piezoelectric member.

26. The combined microscope of claim 13 in which said means for translating said sample normal to said plane comprises a piezoelectric member.

27. The combined microscope of claim 1 in which said energy is light and said focusing means is an objective.

28. The combined microscope of claim 27 in which said scanning energy microscope is a confocal microscope.

29. The combined microscope of claim 1 in which said scanning probe microscope is an atomic force microscope including a cantilever bearing a tip constituting said probe.

30. The combined microscope of claim 29 in which said atomic force microscope includes optical lever detection means for measuring deflection of said cantilever.

31. The combined microscope of claim 1, in which said means for aligning said probe and said focal spot comprises at least one piezo element for precise adjustment.

32. A combined atomic force and scanning confocal microscope, comprising:
   a support for a sample having a surface to be scanned;
   an atomic force microscope including a cantilever bearing a tip arranged so as to be in contact with said sample surface;

a confocal laser scanning microscope including an objective which focuses laser light onto a focal spot of less than 10 micrometers in spatial dimension at said sample and means for detecting light reflected or transmitted from said focal spot;

means for aligning said tip and said focal spot; and means for translating said sample substantially along a horizontal plane with respect to said tip and said objective whereby to produce atomic force and confocal microscope images in substantial registration.

33. The combined microscope of claim 32 in which said plane is between said tip and said objective.

34. The combined microscope of claim 32 in which said plane is below said tip and said objective.

35. The combined microscope of claim 32 in which said tip and focal spot are aligned relatively on-axis.

36. The combined microscope of claim 32 in which said tip and focal spot are laterally separated by a small offset.

37. The combined microscope of claim 32 in which said focal spot is below the surface of said sample.

38. The combined microscope of claim 32 in which said focal spot is on the surface of said sample.

39. The combined microscope of claim 32 including means for translating said tip normal to said plane.

40. The combined microscope of claim 32 including means for translating said focal spot normal to said plane.

41. The combined microscope of claim 40 including means for translating said tip normal to said plane.

42. The combined microscope of claim 41 in which said tip generates a signal indicative of sample surface height, and including feedback means responsive to said sample surface height signal to maintain said tip and focal spot on, or in close proximity to, said sample surface during said scanning operations.

43. The combined microscope of claim 42 in which said signal responsive means includes means for translating said sample normal to said plane.

44. The combined microscope of claim 42 in which said signal responsive means includes means for translating said tip and focal spot in tandem.

45. The combined microscope of claim 32 including means for translating said focal spot along said plane.

46. The combined microscope of claim 32 including means for translating said tip along said plane.

47. The combined microscope of claim 32 in which said light detecting means is capable of detecting triboluminescent energy resulting from interaction of said tip with said sample.

48. The combined microscope of claim 32 including means for mechanically moving said atomic force microscope and said confocal laser scanning microscope both along said plane and normal to said plane whereby to effect at least approximate alignment of said tip and focusing means.

49. The combined microscope of claim 32 in which said translating means comprises X and Y translating piezoelectric members.

50. The combined microscope of claim 39 in which said means for translating said tip normal to said plane comprises a piezoelectric member.

51. The combined microscope of claim 40 in which said means for translating said focal spot normal to said plane comprises a piezoelectric member.

52. The combined microscope of claim 43 in which said means for translating said sample normal to said plane comprises a piezoelectric member.

53. The combined microscope of claim 32 in which said atomic force microscope includes optical lever detection means for measuring deflection of said cantilever.

54. The combined microscope of claim 32 including means for forming a fluid cell around said probe to contain a fluid, in which said cantilever is submerged.

55. The combined microscope of claim 32 in which said means for aligning said tip and said focal spot comprises at least one piezo element for precise alignment.

56. A method for producing scanning probe and scanning energy microscope images in substantial registration, comprising:

supporting a sample having a surface to be scanned;

arranging a probe so as to be in contact with, or closely proximate to, said sample surface;

focusing energy from an energy generating means to a focal spot at said sample, and detecting energy reflected or transmitted from said focal spot;

aligning said probe and said focal spot; and translating said sample substantially along a horizontal plane with respect to said probe and said focusing means whereby to produce scanning probe and scanning energy microscope images in substantial registration.

57. The method of claim 56 in which said plane is between said probe and said focusing means.

58. The method of claim 56 in which said plane is below said probe and said focusing means.

59. The method of claim 56 in which said probe and focal spot are aligned relatively on-axis.

60. The method of claim 56 in which said probe and focal spot are laterally separated by a small offset.

61. The method of claim 56 in which said scanning probe and scanning energy microscope images are produced simultaneously.

62. The method of claim 56 in which said focal spot is less than 10 micrometers in spatial dimension at said sample.

63. The method of claim 56 in which said focal spot is below the surface of said sample.

64. The method of claim 56 in which said focal spot is on the surface of said sample.

65. The method of claim 56 in which said probe is translated normal to said plane.

66. The method of claim 56 in which said focal spot is translated normal to said plane.

67. The method of claim 66 in which said probe is translated normal to said plane.

68. The method of claim 67 in which said probe generates a signal indicative of sample surface height, and including the step of maintaining said probe and focal spot on, or in close proximity to, said sample surface in response to signal during said scanning operations.

69. The method of claim 68 including the step of translating said sample normal to said plane in response to said signal.

70. The method of claim 68 including the step of translating said probe and focal spot in tandem in response to said signal.

71. The method of claim 56 in which energy generated by said probe is detected by said energy scanning means.

72. The method of claim 71 in which said detected energy is triboluminescent energy resulting from interaction of said probe with said sample.

73. The method of claim 56 in which energy generated by said energy focusing means is detected by said probe.

74. The method of claim 73 in which said scanning probe microscope is an atomic force microscope and said energy is an acoustic signal.

75. The method of claim 73 in which said scanning probe microscope is a scanning tunneling microscope and said generated energy is a photocurrent.

76. The method of claim 56 in which said energy is light and said focusing means is an objective.

77. The method of claim 76 in which said scanning energy microscope is a confocal microscope.

78. The method of claim 56 in which said scanning probe microscope is an atomic force microscope including a cantilever bearing a scanning tip constituting said probe.

79. The method of claim 78 in which deflection of said cantilever is measured by optical lever detection means.

80. The method of claim 56 in which said probe and said focal spot are aligned by means comprising at least one piezo element for precise alignment.

81. A method for producing atomic force and scanning confocal microscope images in substantial registration, comprising:

supporting a sample having a surface to be scanned;

arranging the tip of the cantilever of an atomic force microscope to be in contact with, or closely proximate to, said sample surface;

using the objective of a confocal laser scanning microscope to focus laser light to a focal spot at said sample, and detecting light reflected or transmitted from said focal spot;

aligning said tip and said focal spot; and translating said sample substantially along a horizontal plane with respect to said tip and said objective whereby to produce atomic force and confocal microscope images in substantial registration.

82. The method of claim 81 in which said plane is between said tip and said objective.

83. The method of claim 81 in which said plane is below said tip and said objective.

84. The method of claim 81 in which said tip and focal spot are aligned relatively on-axis.

85. The method of claim 81 in which said tip and focal spot are separated by a small offset.

86. The method of claim 81 in which said atomic force confocal microscope images are produced simultaneously.

87. The method of claim 81 in which said focal spot is less than 10 micrometers in spatial dimension at said sample.

88. The method of claim 81 in which said focal spot is below the surface of said sample.

89. The method of claim 81 in which said focal spot is on the surface of said sample.

90. The method of claim 81 in which said tip is translated normal to said plane.

91. The method of claim 81 in which said focal spot is translated normal to said plane.

92. The method of claim 91 in which said tip is translated normal to said plane.

93. The method of claim 92 in which said tip generates a signal indicative of sample surface height, and including the step of maintaining said tip and focal spot on, or in close proximity to, said sample surface in response to signal during said scanning operations.

94. The method of claim 93 including the step of translating said sample normal to said plane in response to said signal.

95. The method of claim 93 including the step of translating said tip and focal spot in tandem in response to said signal.

96. The method of claim 81 in which energy generated by said tip during its scanning operation is detected by said confocal scanning microscope.

97. The method of claim 96 in which said detected energy is triboluminescent energy resulting from interaction of said probe with said sample.

98. The method of claim 81 in which said tip and said focal spot are aligned by means comprising at least one piezo element for precise alignment.

* * * * *

UNITED STATES PATENT AND TRADEMARK OFFICE
CERTIFICATE OF CORRECTION

PATENT NO. : 5,581,082
DATED : December 3, 1996
INVENTOR(S) : Paul K. Hansma, et al.

It is certified that error appears in the above-indentified patent and that said Letters Patent is hereby corrected as shown below:

Column 3, line 33, cancel "$\alpha$" and substitute --$\Delta$--.

Column 3, line 34, cancel "$\alpha$" and substitute --$\Delta$--.

Column 3, line 37, cancel "$\alpha$" and substitute --$\Delta$--.

Column 8, line 38, cancel "$\alpha$" and substitute --$\Delta$--.

Column 9, line 5, cancel "The" and substitute --the--.

Column 9, line 31, after "300" and before "are" insert --$\mu$m--.

Column 10, line 29, cancel "°" and insert -- + --.

Column 10, line 30, after "$\phi$" and before "yields" insert a space --  --.

Signed and Sealed this

Twenty-second Day of April, 1997

Attest:

*Attesting Officer*

BRUCE LEHMAN

*Commissioner of Patents and Trademarks*